Aug. 20, 1963

J. C. PRISCU 3,101,249

CHLORINATION APPARATUS AND PROCESS

Filed Oct. 26, 1959

INVENTOR.
John C. Priscu

BY

Agent

Aug. 20, 1963    J. C. PRISCU    3,101,249
CHLORINATION APPARATUS AND PROCESS
Filed Oct. 26, 1959    2 Sheets-Sheet 2

INVENTOR.
John C. Priscu
BY
Agent 3,101,249
CHLORINATION APPARATUS AND PROCESS
John C. Priscu, Las Vegas, Nev., assignor to Titanium Metals Corporation of America, New York, N.Y., a corporation of Delaware
Filed Oct. 26, 1959, Ser. No. 848,633
6 Claims. (Cl. 23—87)

This invention relates to the chlorination of metal bearing materials and apparatus useful therefor.

Metal bearing materials, as for example ilmenite ore, have been chlorinated to produce titanium and iron chlorides by first briquetting the ore with carbon and treating the briquettes in a shaft furnace with chlorine. The chlorine efficiency of such a process has often been low, and the cost of briquetting the raw materials, the cost of binders, necessity for a preliminary coking of the briquettes and handling difficulties have created a need for a simpler and more efficient method. A technique commonly known as fluidized chlorination has been employed, with some success, in which the ore and carbon are charged to the furnace as finely subdivided particles which are maintained as a bed in a state of over-all turbulent motion by upwardly flowing chlorine. To operate a fluidized bed type of reaction, the lower portion of the furnace is provided with a horizontal partition having a plurality of orifices through it and known as a distributor plate. The orifices through the distributor plate communicate with the wind box or chlorine reservoir below. Chlorine supplied to the wind box is distributed upwardly through the orifices over the cross sectional area of the bed of ore, to maintain the bed in fluidized condition and to react with the ore and carbon to form volatile chlorides. Fluidizing furnaces have shown good efficiency but the corrosive nature of chlorine has made it extremely difficult to design and maintain the wind box and particularly the distributor plate for uninterrupted operation over extended periods. Additionally, the orifices in the distributor plate have been difficult to maintain in their original size and operating condition with the tendency of solids from the bed above to sift down through them and into the wind box, particularly if the chlorine gas flow is reduced or shut off.

It is therefore a principal object of this invention to provide an improved apparatus for chlorination of metal bearing material. Another object of this invention is to provide a simpler, more economical and efficient chlorination furnace. Still another object of this invention is to provide a chlorination furnace capable of long periods of uninterrupted operation. Yet another object of this invention is to provide a chlorination furnace suitable for chlorinating finely divided metal oxide ore but having no wind box or distributor plate. A further object of this invention is to provide an improved method for chlorinating metal bearing material. These and other objects of this invention will be apparent from the following description thereof and from the annexed drawings in which:

Figure 1:
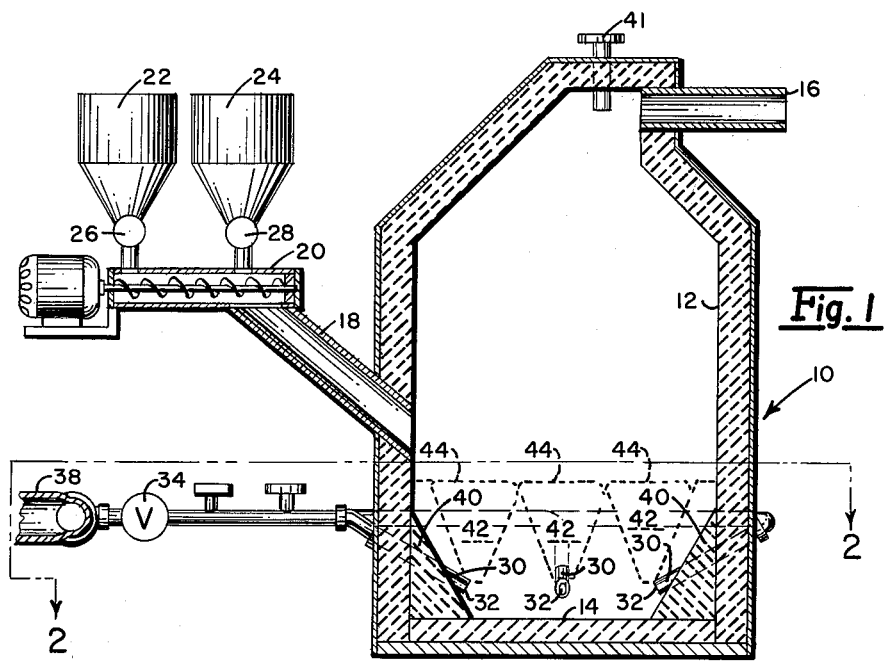
FIG. 1 shows a vertical section of a furnace embodying features of this invention.
Figure 2:
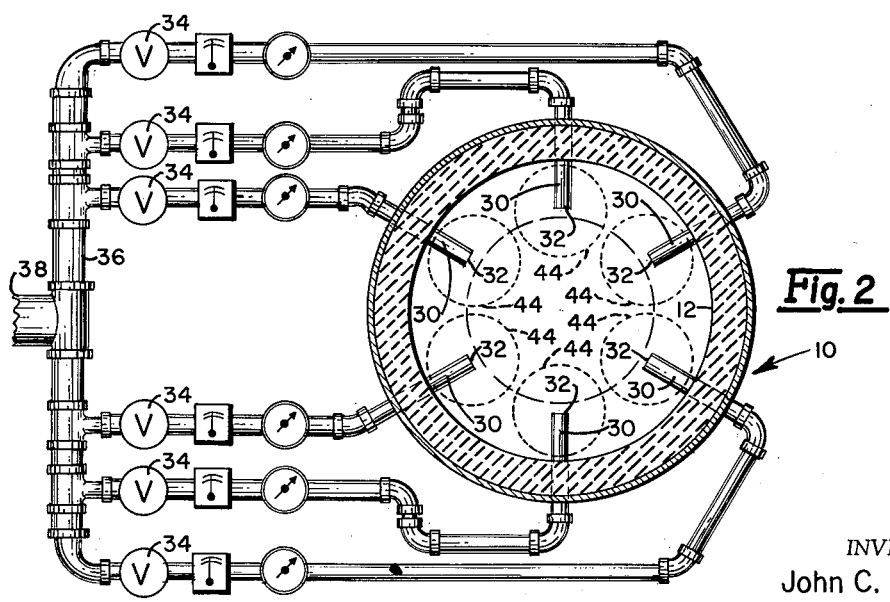
FIG. 2 shows a horizontal section of the furnace of FIG. 1, taken along the line 2—2.

Referring now to FIGS. 1 and 2, the chlorination apparatus comprises a furnace shell indicated generally at 10 which may, as shown, be circular in cross section having sidewall 12 and bottom 14. In an upper part of the furnace shell 10 near or at the top thereof is provided a product gas take-off pipe 16. Intermediate the top and bottom of furnace 10 are provided means for supplying subdivided metal bearing feed material which comprise feed chute 18 which is arranged to enter through the sidewall 12 at a height preferably above that at which the top surface of the bed of metal bearing material will be maintained in the furnace. Screw conveyor 20 supplies ore and carbon to chute 18 from bins 22 and 24, the outflow from these bins being controlled suitably by feeders 26 and 28, so as to provide the proper proportion of metal bearing material and carbon to the interior of furnace shell 10 through chute 18.

Intruding into the furnace shell 10 through the lower part of sidewall 12 are a plurality of chlorine feed pipes 30, whose open ends 32 are spaced apart from each other and from the sidewall 12 and from the bottom 14 of the furnace shell 10. Pipes 30 are arranged so that their open ends 32 point generally inwardly and downwardly, preferably at an angle of between 15 and 60 degrees to the horizontal. Preferably each of pipes 30 is provided with means for controlling the chlorine flow therethrough such as valve 34 located exteriorly of the furnace, and the exterior ends of pipes 30 are connected to chlorine supply pipe 36 which is in turn connected to chlorine main pipe 38. Chlorine feed pipes 30, supply pipe 36 and main pipe 38 are preferably of relatively large diameter to handle the required volume of chlorine flow at the desired pressure. To avoid corrosion, chlorine pipes 30 are preferably fabricated of chlorine resistant, preferably ceramic, material; and fillet 40 is placed at the juncture of the sidewall and the bottom of furnace 10 as shown, to support the intruding portions of pipes 30, and which also serves to fill up the corner between sidewall 12 and bottom 14. A viewing port with suitable sealed sight glass is advantageously provided for periodic viewing as at 41, in the top of the furnace shell so that the surface of the bed and action in the furnace may be observed.

Preferably the open ends 32 of chlorine pipes 30 are arranged so that each is spaced apart approximately an equal distance from adjacent chlorine feed pipe ends, and the distance between each feed pipe end 32 and the sidewall 12 and the bottom 14 of the furnace shell 10 is not less than one half the aforementioned distance between adjacent feed pipe ends.

Figure 3:
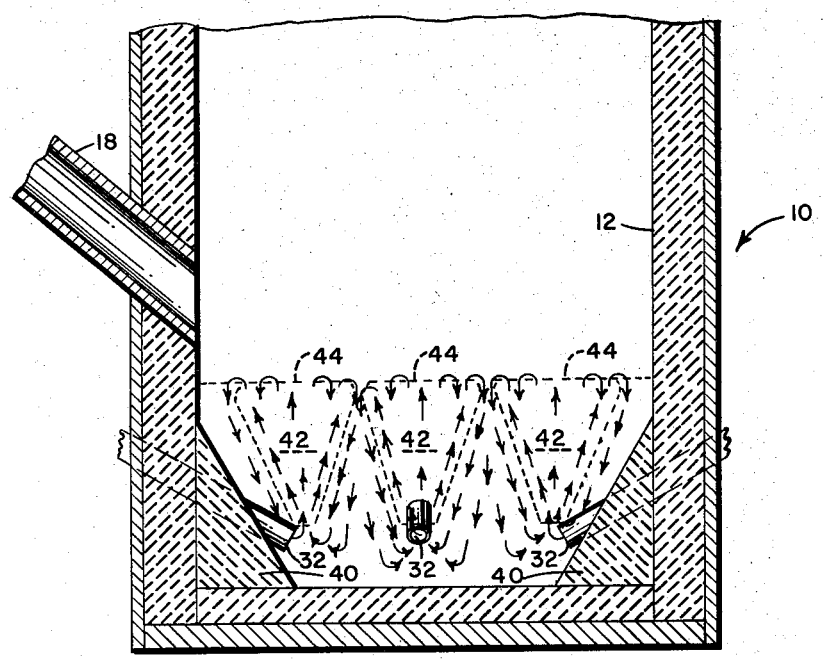
FIG. 3 shows in sectional detail the type of columns of upwardly rising particles of metal bearing material obtained during operation of the method of this invention.

Operation of the apparatus of this invention will be described employing ilmenite, which is an iron and titanium bearing material, with the understanding that other metal bearing materials may be similarly chlorinated. As a preliminary the furnace interior should be heated to operating temperature which may be between about 700° C. and 1200° C. and this is conveniently accomplished by feeding carbon, coal or coke into the furnace igniting it and introducing air through chlorine feed pipes 30 until the resulting fire has heated the furnace to the desired temperature. Then ilmenite and coke, as subdivided particles, are fed in through chute 18 to form a bed in the furnace, agitation of the bed being maintained by continuing to introduce air. When the bed is sufficiently hot and ready for chlorination, the air supply is shut off and chlorine is introduced through feed pipes 30. Entry of chlorine into the bed will form individual columns of upwardly flowing ilmenite as will be more readily appreciated by reference to FIG. 3. Due to the placement and arrangement of chlorine feed pipes 30 the initial direction of the chlorine flowing from the ends 32 thereof will be inward and downward with respect to the ilmenite bed. Then the chlorine flows upwardly, since the only outlet is in the upper part of the furnace shell, and forms a rising column of ilmenite and carbon in the upwardly flowing chlorine and product gases. This column will not be sharply defined but will take the shape generally of an inverted cone as shown at 42 in FIG. 3. The tops of columns 42 where they break the upper surface of the bed form more or less distinct circular eruptions 44. Unreacted ilmenite and carbon having erupted at the tops of columns 42 then flows downwardly toward the bottom of the bed between the upwardly flowing material in columns 42. When it reaches the vicinity of any of the chlorine feed pipe ends 32 it is picked up again by the chlorine stream into an upwardly rising column. Thus, there results a continuous circulation of ilmenite and carbon up and down within the bed providing excellent contact with chlorine in the upwardly flowing columns as described, and efficient chlorination. Extended operation involves continuous or intermittent feeding of ilmenite and carbon into the furnace through chute 18, to replace these materials consumed in the reaction, the input of chlorine through pipes 30 in amount to react efficiently with the ilmenite feed, and withdrawal of product gases, which will include titanium tetrachloride, iron chloride, and carbon monoxide and dioxide, through take-off pipe 16.

Location of the ends 32 of chlorine feed pipes 30 is important to prevent contact of chlorine with the furnace sidewall 12 or its bottom 14. It is preferred that the eruptions 44 in the surface of the bed be spaced apart from the sidewall 12 so that only downward flowing ilmenite and coke and gases, from which free chlorine has essentially all been used up by reaction in the upwardly flowing columns, comes in contact with the sidewall. Thus, rapid corrosion of sidewall 12 by contact with chlorine is substantially eliminated. It is also preferred that the open ends 32 of pipes 30 be located so that the eruptions of the columns over each one do not overlap so that space between them is provided to allow smooth downward circulation of solids in the bed. If the eruptions overlap this produces undesirable turbulence in the overlapping portion and a reduction in the efficiency of the chlorine employed. For this reason, an advantageous arrangement requires spacing the open ends 32 of pipes 30 at a substantially equal distance from adjacent pipe ends 32 so that efficient utilization of the bed cross section area may be obtained without interference between columns. And in such a symmetrical arrangement the distance between the pipe ends 32 and furnace sidewall 12 should not be less than one half the pipe end space distance to avoid any contact of material and gas in an upwardly rising column with the sidewall.

Provision of downwardly pointing chlorine feed pipes 30 is important to prevent sifting of solid material into the feed pipe, particularly under conditions when chlorine issuing through the pipe may be shut off temporarily or slowed down. The downwardly pointing pipe avoids outlet clogging but, as described hereinbefore, the pipe end must be spaced apart from the bottom 14 of the furnace shell so that chlorine flowing out of the pipe does not contact the bottom before its flow direction turns upwardly to form the rising column. For the same reason it is preferred that the chlorine feed pipes 30 point inwardly with respect to the bed to avoid any possibility of chlorine issuing from the pipe contacting the sidewall in that vicinity.

The apparatus and process of this invention are suitable for use in treating metal bearing materials, such as ores, concentrates, and raw or partly prepared materials, as well as refined oxides and oxidic compounds which are amenable to chlorination to produce a chloride of a contained metal. Such materials may contain a variety of metals such as iron, titanium, tin, aluminum, zirconium, vanadium, molybdenum, columbium and tantalum, for example. Rutile concentrate, which contains about 95% $TiO_2$ may be chlorinated to produce $TiCl_4$, as may ilmenite which in addition contains an appreciable proportion of iron oxide which is converted to iron chloride. Zircon may be chlorinated to produce $ZrCl_4$ with accompanying production of silicon chloride. Tantalite and columbite may be chlorinated individually or as a combined ore or concentrate to produce corresponding chlorides or oxychlorides. The chlorinatable compounds are generally oxidic, and carbon, as coke or coal, or in other convenient form, is employed to combine the oxygen freed from the metal by the chlorination reaction. The ore and carbon employed in the practice of this invention are chlorinated as subdivided particles and the size of such particles will vary considerably depending on the particular furnace size, the depth of bed and upward flow of chlorine. The particles must be fine enough to be suspended in the chlorine streams and react readily, but not so fine that they tend to be blown out of the bed. Particle sizes between minus 20 mesh and minus 200 mesh will be found advantageous in most cases. Rutile of particle size about 75% minus 100 mesh, and ilmenite of about the same size, have been sucessfully chlorinated. Under the same conditions coke ground to minus 20 mesh has been found convenient and efficient.

The following will illustrate a selected embodiment of the practice of this invention.

*Example 1*

A furnace of the type illustrated in FIGS. 1 and 2 was employed comprising a refractory lined shaft furnace of internal diameter of 7½ feet with six spaced apart chlorine inlet pipes arranged near the bottom of the furnace substantially as shown.

A charge of 10 tons of rutile ore, of screen analysis as follows:

| | Percent |
|---|---|
| Plus 65 mesh | 1 |
| Plus 100 mesh | 22.4 |
| Minus 100 mesh | 76.6 | was introduced into the furnace through the feed chute together with 5 tons of powdered coke of screen analysis as follows:

| | Percent |
|---|---|
| Plus 20 mesh | 2.7 |
| Plus 35 mesh | 17.5 |
| Plus 48 mesh | 20.0 |
| Plus 65 mesh | 24.3 |
| Plus 100 mesh | 22.7 |
| Minus 100 mesh | 12.8 |

The coke was ignited and combustion maintained by admitting air into the furnace shell through the chlorine feed pipes. The amount of air admitted was sufficient to maintain the bed of ore and coke in agitated turbulent condition. After initial rapid combustion of the coke, the fire was maintained to raise the temperature of the charge to 900° C. and additional coke of the same particle size was introduced to maintain the coke content of the ore-coke mixture in the furnace at between 25% and 35%. The charge in the furnace was held under these conditions for about 20 hours and during this period no chlorine was admitted to the furnace. This heating period was for the purpose of conditioning the ore to render it reactive for chlorination, as more particularly described and claimed in my copending application Serial No. 824,905, now abandoned. After this time had elapsed the air flow to the chlorine feed pipes was shut off and chlorine gas introduced through these feed pipes. Fresh powdered rutile and coke was continuously fed into the furnace shell through the feed chute. The ore was fed in at a rate of 1000 pounds per hour and coke at the rate of 300 pounds per hour. The chlorine flow was carefully adjusted to maintain individual columns of rising ore and coke above each of the chlorine supply positions, that is, the ends of the chlorine feed pipes, and this adjustment was set so that the eruptions of these columns through the surface of the ore-coke bed did not overlap each other and did not contact the sidewall of the furnace. The chlorine flow at 8 to 10 pounds per square inch pressure through two inch diameter ceramic chlorine feed pipes necessary to maintain the desired conditions in the bed, was about 1700 pounds per hour.

The chlorination reaction started immediately on introduction of chlorine to the charge. Titanium tetrachloride was produced as a vapor and withdrawn from the furnace shell through the outlet near its top together with other gases including carbon dioxide and carbon monoxide. The titanium tetrachloride was condensed from its admixture with the other gases in a cooling tower employing a spray of cold liquid TiCl$_4$ according to known principles.

The reaction continued with high chlorine efficiency indicated by the substantial absence of free chlorine in the product gases, and the exothermic heat produced was sufficient to maintain a temperature in the reaction zone of about 900° C. The feed rate of ore and carbon was balanced against the chlorine input rate so that the height of the bed of ore and coke in the furnace remained substantially constant at about 125 inches.

The TiCl$_4$ produced was of acceptable quality after normal purification procedure, which included separation of incidental quantities of entrained solids, for the manufacture of titanium metal or titanium oxide pigment, and the reaction efficiency, indicated by the lack of free chlorine in the product gases was excellent.

Corrosion effects and the life of refractory components in a furnace of the type described herein cannot usually be accurately predicted from the results of small scale, short time tests. Therefore, the chlorination process described in Example 1 was run without shutting down and cooling the furnace for a period of eighteen months in order to obtain a reliable test of the construction described over an extended period. At the end of this time the chlorinator was shut down and cooled, and examination of the interior brick work showed only normally expected erosion and wear of the refractory liner. It appeared that the chlorinator could have been operated for about an additional six month period. It was significant that no corrosion by contact of chlorine with the refractory liner of the furnace was evident, and no mechanical difficulty was experienced during this long operating time with the chlorine feed pipes or other components of the furnace inside the shell.

The apparatus of this invention makes possible economical operation of a chlorinator over an extended period of time. The unique arrangement of chlorine feed pipes provides an extremely efficient method of introducing chlorine into a bed of particulate material. It makes possible reaction of chlorine with metal bearing materials in a suspended bed type of operation without the initial cost of expensive wind box and distributor plate construction. The resulting chlorination operation therefore advantageously employs, at least in part, the efficient reaction conditions of a fluidized bed without the heretofore attendant disadvantages in furnace construction and maintenance. Furthermore it will be apparent that chlorinator feed pipes may be located, according to this invention, to introduce chlorine as descibed over the horizontal area of a very large diameter chlorinator, thus increasing production of the desired chloride from a single unit. It is noteworthy, on the other hand, that the distributor plate construction, employed in so-called fluidized bed chlorinators becomes increasingly complex and difficult as the chlorinator diameter increases. This is caused by the fact that the distributor plate must span the furnace diameter and must be mechanically strong enough to support the correspondingly heavy bed above, and at the same time its materials of construction must be resistant to corrosion by chlorine. Applicant's arrangement of chlorine feed pipes, however, avoids the problem of mechanical support for the bed in the area of chlorine introduction, and except for the chlorine feed pipes themselves, chlorine corrosion effects are substantially eliminated. The chlorine feed pipes may be constructed of material having excellent corrosion resistance such as acid resistant cast refractory material, and since they may be supported inside the furnace shell by the fillet described, the fact that this refractory has relatively poor mechanical strength is of no practical consequence.

A further advantage of employment of the chlorine feed pipes, according to this invention, is that the chlorine flow to each may be individually controlled. Thus the flow from each pipe may be regulated to provide a uniform chlorine supply to each of the upwardly flowing reaction columns. No such control is possible in a chlorinator equipped with a wind box and conventional distributor plate.

I claim:

1. The method of chlorinating a metal oxide-bearing material in an upstanding furnace shell, penetrated by gas inlets spaced thereabout adjacent its base, a materials feed inlet disposed above said gas inlets and a gas take-off outlet adjacent the top, which comprises: progressively feeding a comminuted admixture of said material and a solid carbonaceous reductant through said materials feed inlet into said furnace shell to form therein a bed of said admixture of substantial depth, supplying chlorine gas to said bed through said gas inlets in a direction initially generally downwardly and inwardly with respect to said bed and adjacent the base thereof, while maintaining said bed at elevated temperature at which said components react to evolve said metal chloride in gaseous form, and while withdrawing product gases from the interior of said furnace shell through said outlet, and so regulating the feed rate of said admixture as to maintain said bed at substantially constant depth, and also so regulating the supply of said chlorine gas as to form individual columns in said bed of upwardly rising particles of said admixture suspended in upwardly flowing chlorine and product gases, the eruptions of which columns from the upper surface of said bed are spaced apart from the sidewall of said furnace shell and from each other.

2. The method of chlorinating a titanium oxide-bearing material in an upstanding furnace shell, penetrated by gas inlets spaced thereabout adjacent its base, a materials feed inlet disposed above said gas inlets and a gas take-off outlet adjacent the top, which comprises: progressively feeding a comminuted admixture of said material and a solid carbonaceous reductant through said materials feed inlet into said furnace shell to form therein a bed of said admixture of substantial depth, supplying chlorine gas to said bed through said gas inlets in a direction initially generally downwardly and inwardly with respect to said bed and adjacent the base thereof, while maintaining said bed at elevated temperature at which said components react to evolve titanium tetrachloride in gaseous form, and while withdrawing product gases from the interior of said furnace shell through said outlet, and so regulating the feed rate of said admixture as to maintain said bed at substantially constant depth, and also so regulating the supply of said chlorine gas as to form individual columns in said bed of upwardly rising particles of said admixture suspended in upwardly flowing chlorine and product gases, the eruptions of which columns from the upper surface of said bed are spaced apart from the sidewall of said furnace shell and from each other.

3. Apparatus for chlorination of a metal bearing material to produce a chloride of a metal of said material comprising; a refractory lined, furnace shell having a solid uninterrupted and imperforate base, a feed chute leading through the sidewall of said furnace shell intermediate the bottom and top thereof, means for supplying comminuted metal bearing material to said feed chute, a product gas take-off pipe near the top of said shell, and a plurality of independently controlled chlorine feed pipes intruding through a lower part of the sidewall of said shell, said chlorine feed pipes being formed of chlorine resistant, refractory material and pointing generally inwardly and downwardly toward the bottom of said shell, and with the ends of said chlorine feed pipes spaced apart from the bottom of said shell, from the sidewall of said shell and from each other.

4. Apparatus for chlorination of a metal bearing material to produce a chloride of a metal of said material comprising; a refractory lined, furnace shell having a solid uninterrupted and imperforated base, a feed chute leading through the sidewall of said furnace shell intermediate the bottom and top thereof, means for supplying comminuted metal bearing material to said feed chute, a product gas take-off pipe near the top of said shell, and a plurality of independently controlled chlorine feed pipes intruding through a lower part of the sidewall of said shell, said chlorine feed pipes being formed of chlorine resistant, refractory material and pointing generally inwardly and downwardly toward the bottom of said shell, and with the end of each of said chlorine feed pipes spaced apart approximately an equal distance from the ends of other chlorine feed pipes adjacent thereto, and spaced apart from the bottom and from the sidewall of said shell a distance of at least one half of the distance between said end and the ends of chlorine feed pipes adjacent thereto.

5. Apparatus for chlorination of a metal bearing material to produce a chloride of a metal of said material comprising; a refractory lined, furnace shell having a solid uninterrupted and imperforate base, a feed chute leading through the sidewall of said furnace shell intermediate the bottom and top thereof, means for supplying comminuted metal bearing material to said feed chute, a product gas take-off pipe near the top of said shell, and a plurality of independently controlled chlorine feed pipes intruding through a lower part of the sidewall of said shell, said chlorine feed pipes being formed of chlorine resistant, refractory material and pointing generally inwardly and downwardly at an angle between 15° and 60° to the horizontal toward the bottom of said shell, and with the ends of said chlorine feed pipes spaced apart from the bottom of said shell, from the sidewall of said shell and from each other.

6. Apparatus for chlorination of a metal bearing material to produce a chloride of a metal of said material comprising; a refractory lined, furnace shell having a solid uninterrupted and imperforate base, a feed chute leading through the sidewall of said furnace shell intermediate the bottom and top thereof, means for supplying comminuted metal bearing material to said feed chute, a product gas take-off pipe near the top of said shell, a plurality of independently controlled chlorine feed pipes intruding through a lower part of the sidewall of said shell, said chlorine feed pipes being formed of chlorine resistant, refractory material and pointing generally inwardly and downwardly toward the bottom of said shell, and with the ends of said chlorine feed pipes spaced apart from the bottom of said shell, from the sidewall of said shell and from each other and a refractory fillet at the juncture of the bottom and sidewall of said shell supporting for at least a major part of their length the portions of said chlorine feed pipes interior of said shell.

References Cited in the file of this patent

UNITED STATES PATENTS

| | | |
|---|---|---|
| 1,475,502 | Manning | Nov. 27, 1923 |
| 1,652,224 | Waring | Dec. 13, 1927 |
| 2,291,206 | Bowes | July 28, 1942 |
| 2,621,118 | Cyr et al. | Dec. 9, 1952 |
| 2,789,034 | Swaine et al. | Apr. 16, 1957 |
| 2,798,030 | Hettick et al. | July 2, 1957 |
| 2,813,016 | Thornhill | Nov. 12, 1957 |
| 2,855,273 | Evans et al. | Oct. 7, 1958 |
| 2,886,518 | Schulman et al. | May 12, 1959 |
| 2,985,517 | Harper | May 23, 1961 |